(12) United States Patent
Samie et al.

(10) Patent No.: US 9,709,102 B2
(45) Date of Patent: Jul. 18, 2017

(54) TRANSMISSION FOR A POWERTRAIN SYSTEM

(71) Applicant: GM GLOBAL TECHNOLOGY OPERATIONS LLC, Detroit, MI (US)

(72) Inventors: Farzad Samie, Franklin, MI (US); Tito R. Huffman, East Pointe, MI (US); Chunhao J. Lee, Troy, MI (US); Dongxu Li, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 213 days.

(21) Appl. No.: 14/739,421

(22) Filed: Jun. 15, 2015

(65) Prior Publication Data

US 2016/0363177 A1 Dec. 15, 2016

(51) Int. Cl.
| | |
|---|---|
| F16D 25/06 | (2006.01) |
| F16D 25/0638 | (2006.01) |
| F16D 25/04 | (2006.01) |
| F16H 59/74 | (2006.01) |
| F16H 61/30 | (2006.01) |
| F16D 25/12 | (2006.01) |
| F16D 48/02 | (2006.01) |
| B60W 10/06 | (2006.01) |

(52) U.S. Cl.
CPC ....... *F16D 25/0638* (2013.01); *F16D 25/044* (2013.01); *F16D 25/12* (2013.01); *F16D 48/02* (2013.01); *F16H 59/74* (2013.01); *F16H 61/30* (2013.01); *B60W 10/06* (2013.01); *F16H 2059/746* (2013.01); *F16H 2061/305* (2013.01)

(58) Field of Classification Search
CPC .... F16D 25/0638; F16D 25/044; F16D 25/12; F16H 61/0009; B60W 10/06; B60W 10/023
See application file for complete search history.

(56) References Cited

U.S. PATENT DOCUMENTS

| | | | |
|---|---|---|---|
| 8,512,204 B2 | 8/2013 | Samie et al. | |
| 8,545,354 B2 | 10/2013 | Jones et al. | |
| 2011/0245035 A1* | 10/2011 | Jones | F16D 25/10 |
| | | | 477/70 |
| 2014/0141924 A1 | 5/2014 | Singh | |
| 2014/0230591 A1* | 8/2014 | Reisch | H02K 11/0094 |
| | | | 74/335 |

* cited by examiner

*Primary Examiner* — Ramya Burgess
*Assistant Examiner* — Lillian Nguyen
(74) *Attorney, Agent, or Firm* — Quinn IP Law

(57) ABSTRACT

A transmission includes an input member, a hydraulic pump, a hydraulic circuit, a clutch assembly for transferring torque between the input member and an output member. A mechanically-driven hydraulic pump is rotatably coupled to the input member and is fluidly connected to the hydraulic circuit. The clutch assembly includes a friction clutch pack, a clutch-apply piston, a clutch-release piston and a coned-disc spring. The clutch-release piston is fluidly coupled to a first hydraulic chamber that is fluidly coupled to the hydraulic circuit. The clutch-apply piston is fluidly coupled to a second hydraulic chamber that is selectively fluidly coupled to the hydraulic circuit. A second spring urges the clutch-apply piston and the coned-disc spring urges the clutch-release piston. When the hydraulic pump is not rotating, the clutch assembly is activated by the coned-disc spring urging the clutch-release piston.

20 Claims, 2 Drawing Sheets

TRANSMISSION FOR A POWERTRAIN SYSTEM

TECHNICAL FIELD

This disclosure is related to transmissions for powertrains, and more specifically related to clutch assemblies for transmissions.

BACKGROUND

Powertrain systems include internal combustion engines that mechanically couple to transmission devices to generate, multiply and transfer torque to an output member. Transmissions may include selectively activated friction clutch packs that are hydraulically actuated. Hydraulic pumps may provide pressurized hydraulic fluid to transmission devices to activate and deactivate friction clutch packs. The engine may be capable of executing autostop and autostart events to discontinue engine operation during ongoing powertrain operation to conserve fuel. Hydraulic pumps that are mechanically driven by the engine stop spinning and thus no longer generate hydraulic pressure when the engine is shut down in response to an autostop event. It is known to use an electrically-driven auxiliary hydraulic pump to provide hydraulic pressure for clutch activation when an engine is shut down in response to an autostop event. An electrically-driven auxiliary hydraulic pump adds weight, consumes electrical power, requires packaging space, and increases system complexity of a powertrain system.

SUMMARY

A transmission for a powertrain system includes an input member, a hydraulic pump, a hydraulic circuit, a clutch assembly for transferring torque between the input member and an output member. The hydraulic pump is a mechanically-driven hydraulic pump rotatably coupled to the input member and is fluidly connected to the hydraulic circuit. The clutch assembly includes a friction clutch pack, a clutch-apply piston, a clutch-release piston and a coned-disc spring. The clutch-release piston is fluidly coupled to a first hydraulic chamber that is fluidly coupled to the hydraulic circuit. The clutch-apply piston is fluidly coupled to a second hydraulic chamber that is selectively fluidly coupled to the hydraulic circuit. A second spring urges the clutch-apply piston and the coned-disc spring urges the clutch-release piston. When the hydraulic pump is not rotating, the clutch assembly is activated by the coned-disc spring urging the clutch-release piston.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 2-1, 2-2 and 2-3 schematically illustrate partial cross-sectional views of the transmission in accordance with the disclosure.

DETAILED DESCRIPTION

Figure 1:
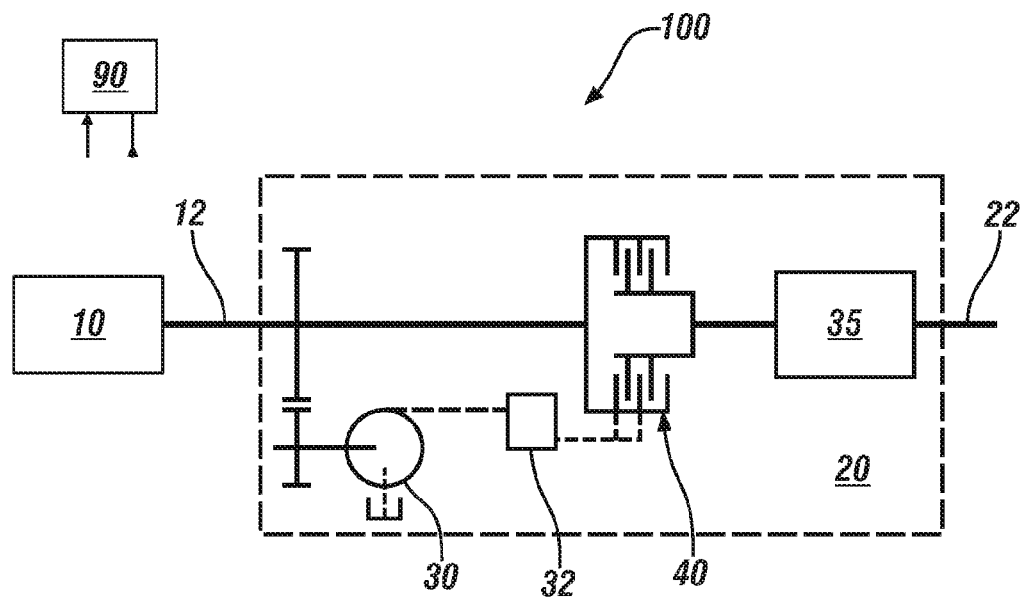
FIG. 1 schematically illustrates a powertrain system including an internal combustion engine (engine) and transmission, in accordance with the disclosure.
Figures 1, 2:
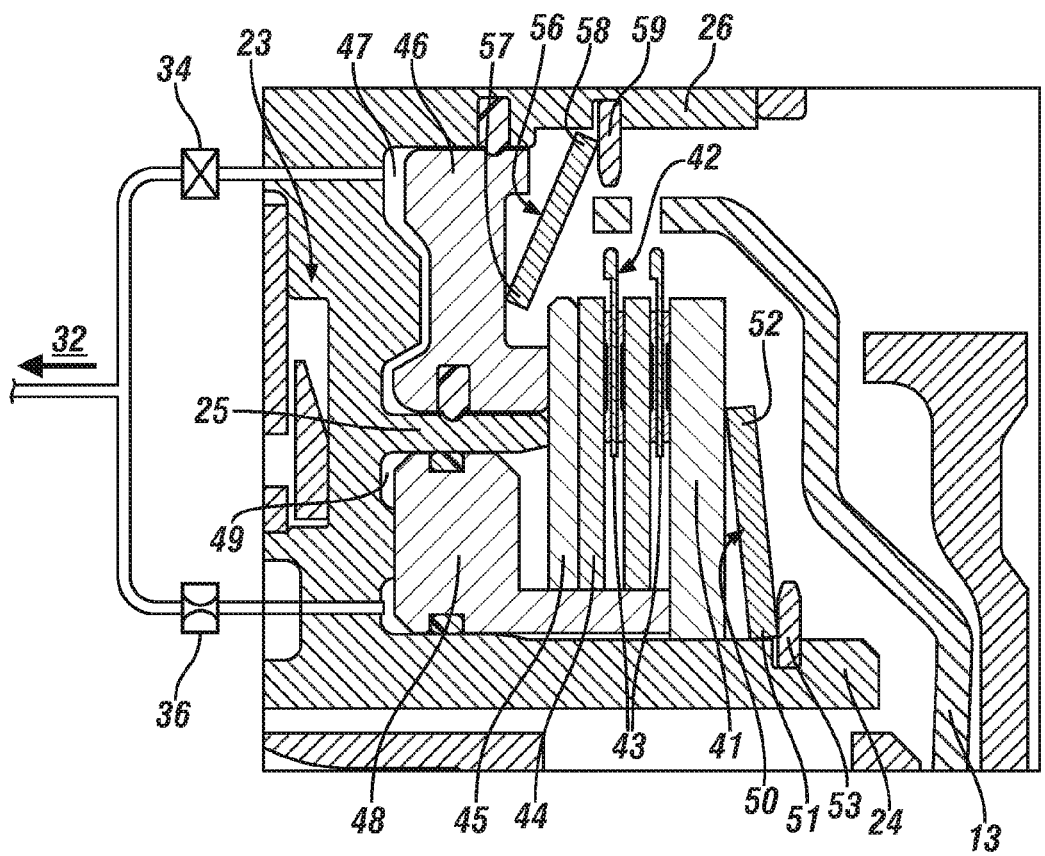
Figure 2:
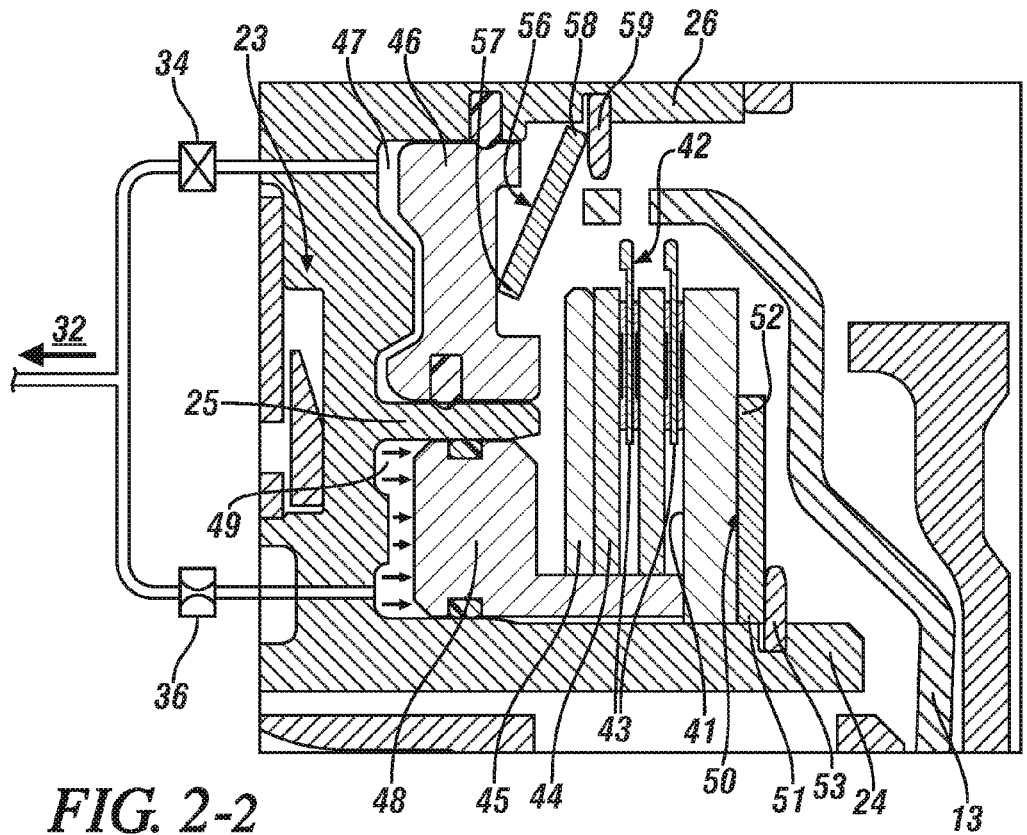
Figures 2, 3:
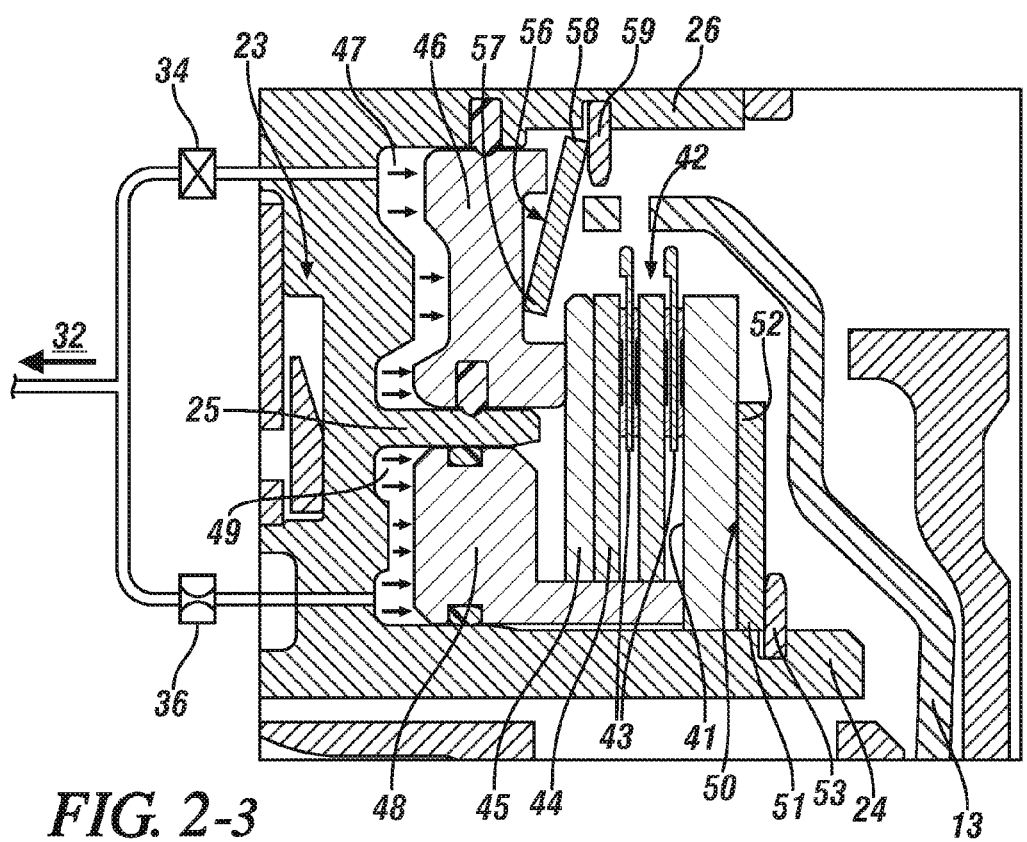

Referring to the drawings, wherein like numerals indicate like or corresponding parts throughout the several views, FIG. 1 schematically illustrates a powertrain system 100 including an internal combustion engine (engine) 10 and transmission 20 and FIGS. 2-1, 2-2 and 2-3 schematically illustrate partial cross-sectional views of the transmission 20 in accordance with an embodiment of this disclosure. A controller 90 monitors and controls operation of various elements of the powertrain system 100. The powertrain system 100 may be employed on a vehicle to provide propulsion torque. In one embodiment, the powertrain system 100 includes the engine 10, which provides propulsion torque to a driveline through the transmission 20. Alternatively, the powertrain system 100 includes the engine 10 and one or a plurality of non-combustion torque generating machines that provide propulsion torque to a driveline through the transmission 20.

The engine 10 couples to the transmission 20 via an input member 12 and may be any suitable internal combustion engine configuration for generating torque that includes a capability to execute autostop events and autostart events during powertrain operation. The engine 10 is rotating and preferably generating torque that is transferred to the input member 12 when in an ON state, and is unfueled and not spinning when in an OFF state. An autostop event includes stopping the engine 10 in response to a command to achieve the OFF state during powertrain operation. An autostart event includes starting or restarting the engine 10. The engine 10 may be started to provide propulsion torque to vehicle drive wheel(s). In one embodiment, the engine 10 may be started to provide power to a generator device to generate energy that can be used by other torque generating machines to generate torque. Engine operations for executing autostop and autostart events are known.

The transmission 20 may be any suitable transmission device for transferring torque between a torque-generating device, e.g., engine 10, and an output member 22 that couples to a driveline. The transmission 20 may be commanded to one of a plurality of gear ranges, including, e.g., Park, Reverse, Neutral and Drive. In one embodiment, the transmission 20 is a multi-step gear transmission that includes a plurality of meshable gears and selectively activatable clutches that are configured to transfer torque generated by the internal combustion engine 10 to the output member 22 in one of a plurality of fixed gear ratios. The fixed gear ratios may be automatically selectable or operator-selected. In one embodiment, the transmission 20 may also transfer torque generated by another torque generator(s), e.g., an electric machine(s) coupled to the output member 22. The transmission 20 includes a mechanically-driven hydraulic pump 30, a hydraulic circuit 32 and a clutch assembly 40, and other torque transfer elements 35 including, by way of non-limiting examples, planetary gear sets, clutches, brakes, and the like.

The hydraulic pump 30 mechanically rotatably couples to the input member 12, e.g., via meshed gears, and supplies pressurized hydraulic fluid to the hydraulic circuit 32 of the transmission 20 when the engine 10 is in the ON state. In one embodiment and as shown the hydraulic pump 30 is the exclusive source for supplying pressurized hydraulic fluid to the hydraulic circuit 32 of the transmission 20, i.e., there is no auxiliary or supplementary hydraulic pump for supplying pressurized hydraulic fluid to the hydraulic circuit 32. In such configurations, there is no pressurized hydraulic fluid in the hydraulic circuit 32 when the engine 10 is in the OFF state.

The hydraulic circuit 32 includes a plurality of conduits, valves, actuators and other controllable elements for supplying pressurized hydraulic fluid to selected locations in the transmission 20 to effect operation in one of a plurality of selected gears and provide lubrication. The hydraulic circuit 32 fluidly connects via a flow restrictor 36 to a first, clutch-release hydraulic chamber 49 of the clutch assembly 40 and selectively fluidly couples to a second, clutch-apply hydraulic chamber 47 by activation of a solenoid-operated flow control valve 34. The flow restrictor 36 provides an in-line pressure delay to dampen effects of pressure change in the hydraulic circuit 32 on the pressure in the clutch-release hydraulic chamber 47, including those due to either engine autostart or autostop events. The controller 90 commands activation and deactivation of the flow control valve 34 to activate and deactivate elements of the clutch assembly 40 when the engine 10 is in the ON state and thus spinning the hydraulic pump 30 to generate hydraulic pressure in the hydraulic circuit 32.

The clutch assembly 40 selectively rotatably couples the engine 10 to the transmission 20 when activated, and decouples the engine 10 from the transmission 20 when deactivated. The clutch assembly 40 preferably includes a clutch backing plate 41, a friction clutch pack 42, a face plate 45, a clutch-apply piston 46, the clutch-apply hydraulic chamber 47, a clutch-release piston 48, the clutch-release hydraulic chamber 49, a first spring 50 and a second spring 56.

The friction clutch pack 42 includes one or a plurality of rotatable friction plate(s) 43 contiguous to and coaxial to rotatable pressure plate(s) 44. The friction plate(s) 43 mechanically couples to a first transmission element 13 that mechanically couples to the transmission input member 12. The pressure plate(s) 44 mechanically couples to a second transmission element 23 that mechanically couples via other transmission elements to the transmission output member 22. The second transmission element 23 is coaxial to the first transmission element 13 and includes an inner annular portion 24, an intermediate annular portion 25 and an outer annular portion 26.

The friction and pressure plates 43 and 44 transfer torque between the first and second transmission elements 13 and 23 when a normal force urges the friction plate(s) 43 to engage the pressure plate(s) 44. It is appreciated that the magnitude of normal force required to urge the friction plate(s) 43 to physically engage the pressure plate(s) 44 to effect torque transfer between the first and second transmission elements 13 and 23 depends on clutch torque capacity, which depends upon design details of a specific system.

The first spring 50 is preferably a coned-disc spring device having a frusto-conical shape, e.g., a Belleville spring. The first spring 50 is arranged in the clutch assembly 40 to apply a magnitude of normal force in a first direction to urge the friction plate(s) 43 to physically engage the pressure plate(s) 44 under specific operating conditions. As is appreciated, when the magnitude of applied normal force is sufficient, the friction plate(s) 43 physically engages the pressure plate(s) 44 to cause the first and second transmission elements 13 and 23 to rotate in concert, thus activating the friction clutch pack 42. The first spring 50 is fabricated from suitable spring steel and has an annular, truncated conical shape that includes an inner periphery 51 and an outer periphery 52. Spring steels are low alloy, medium or carbon steels having high yield strengths that deform in response to an applied force, and return to their original shape when an applied force is removed. The first spring 50 is arranged such that the inner periphery 51 mechanically contacts an annular spring stop 53 that is attached to the inner annular portion 24. The annular spring stop 53 provides a fulcrum point against which the inner periphery 51 of the first spring 50 acts, and the output periphery 52 interacts with an outer face of the backing plate 41 to apply a normal force on the backing plate 41. In this manner, the first spring 50 may urge the backing plate 41 against the friction plate(s) 43. The first, clutch-release hydraulic chamber 49 is formed between the inner annular portion 24 and the intermediate annular portion 25, and the clutch-release piston 48 is inserted therein. The clutch-release hydraulic chamber 49 directly fluidly communicates with the hydraulic circuit 32 without an intervening valve.

The second spring 56 may be any suitable spring device, e.g., a coned-disc device having a frusto-conical shape that includes an inner periphery 57 and an outer periphery 58. The outer periphery 58 rests against a spring stop 59 attached to the outer annular portion 26. The annular spring stop 59 provides a fulcrum point against which the outer periphery 58 of the second spring 56 acts, and the inner periphery 57 interacts with an outer face of the clutch-apply piston 46 to urge the clutch-apply piston 46 towards a back portion of the second transmission element 23. The second, clutch-apply hydraulic chamber 47 is formed between the intermediate annular portion 25 and the outer annular portion 26, and the clutch-apply piston 46 is inserted therein. The clutch-apply hydraulic chamber 47 fluidly communicates with the hydraulic circuit 32 by activation of the flow control valve 34.

When the engine 10 is in the OFF state, there is no hydraulic pressure in the hydraulic circuit 32 and the first spring 50 applies a normal force on the backing plate 41 to urge the friction plate(s) 43 against the pressure plate(s) 44, thus activating the clutch assembly 40. The magnitude of the clutch torque capacity of the clutch assembly 40 is thus based upon a spring constant of the first spring 50 when the engine 10 is in the OFF state. As such, the magnitude of the clutch torque capacity of the clutch assembly 40 when the engine 10 is in the OFF state may be increased by increasing the spring constant of the first spring 50. This is shown with reference to FIG. 2-1. As such, the clutch assembly 40 is normally engaged when the engine 10 is in the OFF state. Such an arrangement facilitates vehicle launch immediately after an engine autostart event prior to an increase in hydraulic pressure associated with operation of the hydraulic pump 30.

When the engine 10 is in the ON state and a commanded transmission gear state is Neutral, the flow control valve 34 is deactivated. The hydraulic pump 30 generates hydraulic pressure in the hydraulic circuit 32 that transfers to the clutch-release hydraulic chamber 49, but no hydraulic pressure is transferred to the clutch-apply hydraulic chamber 47 because the flow control valve 34 is deactivated. The clutch-release hydraulic chamber 49 is pressurized at the operating pressure of the hydraulic circuit 32. The hydraulic pressure in the clutch-release hydraulic chamber 49 acts upon the clutch-release piston 48, which applies pressure against an inner face of the backing plate 41. When the hydraulic pressure in the clutch-release hydraulic chamber 49 is greater than the force exerted on the clutch-release piston 48 by the first spring 50, the clutch-release piston 48 applies pressure against the backing plate 41, moves outwardly and releases the friction plate(s) 43 from engaging the pressure plate(s) 44. Thus, the clutch assembly 40 is disengaged. This is shown with reference to FIG. 2-2.

When the engine 10 is in the ON state and the commanded transmission gear range is one of the propulsion ranges, e.g., Drive, the flow control valve 34 is activated. The hydraulic pump 30 generates hydraulic pressure in the hydraulic circuit 32 that transfers to the clutch-release hydraulic chamber 49 and the clutch-apply hydraulic chamber 47, which receives pressurized hydraulic fluid that urges movement of the clutch-apply piston 46. When the hydraulic pressure in the clutch-apply hydraulic chamber 47 is greater than the force exerted on the clutch-apply piston 46 by the second spring 56, the clutch-apply piston 46 moves outwardly, applying pressure against the face plate 45 to urge the pressure plate(s) 44 to engage the friction plate(s) 43, thus activating the clutch assembly 40 to transfer torque thereacross. The magnitude of the clutch torque capacity of the clutch assembly 40 is thus based upon the hydraulic pressure in the clutch-apply hydraulic chamber 47. This is shown with reference to FIG. 2-3.

The clutch-apply piston 46 is said to be in a deactivated state when no or minimal hydraulic pressure is applied to the hydraulic chamber 47. The clutch-apply piston 46 is said to be in an activated state when hydraulic pressure applied to the hydraulic chamber 47 is sufficient to overcome the normal force applied by the second spring 56.

When no hydraulic pressure is applied in the hydraulic chamber 34, e.g., when the engine 10 is not operating and thus not spinning the hydraulic pump 30 to generate hydraulic pressure, the friction plate(s) 43 engages the pressure plate(s) 44 to activate the friction clutch pack 42 to transfer torque between the first and second transmission elements 13 and 23. Likewise, when hydraulic pressure in the hydraulic chamber 49 is insufficient to overcome the normal force applied by the first spring 50 on the friction plate(s) 43, the friction clutch pack 42 is activated.

When there is sufficient hydraulic pressure in the hydraulic chamber 34 to overcome the normal force applied by the first spring 50 on the friction plate(s) 43, the friction plate(s) 43 disengages the pressure plate(s) 44 and the friction clutch pack 42 is deactivated. In one embodiment, this operating state of deactivating the friction clutch pack 42 can only occur when the engine 10 is operating and thus spinning the hydraulic pump 30 to generate hydraulic pressure when the system includes a hydraulic circuit that includes a mechanically-driven hydraulic pump without a supplementary hydraulic pump, e.g., a pump that is driven by an electric motor.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A transmission for a powertrain system, comprising:
   an input member, a hydraulic pump, a hydraulic circuit, a clutch assembly for transferring torque between the input member and an output member;
   the hydraulic pump being a mechanically-driven hydraulic pump rotatably coupled to the input member, the hydraulic pump being fluidly connected to the hydraulic circuit;
   the clutch assembly including a friction clutch pack, a clutch-apply piston, a clutch-release piston and a coned-disc spring;
   the clutch-release piston being fluidly coupled to a first hydraulic chamber that is fluidly coupled to the hydraulic circuit;
   the clutch-apply piston being fluidly coupled to a second hydraulic chamber that is selectively fluidly coupled to the hydraulic circuit;
   a second spring urging the clutch-apply piston; and
   the coned-disc spring urging the clutch-release piston;
   wherein when the hydraulic pump is not rotating, the clutch assembly is activated by the coned-disc spring urging the clutch-release piston.

2. The transmission of claim 1, wherein when the hydraulic pump is not rotating, the clutch assembly activated by the coned-disc spring urging the clutch-release piston further comprises the clutch assembly having a clutch torque capacity that is based upon to a spring constant of the coned-disc spring.

3. The transmission of claim 1, wherein when the hydraulic pump is rotating and the transmission is commanded to a neutral state, the clutch assembly is deactivated.

4. The transmission of claim 3, wherein when the hydraulic pump is rotating and the transmission is commanded to a propulsion state, the clutch assembly is activated.

5. The transmission of claim 4, further comprising the clutch assembly having a clutch torque capacity that is based upon hydraulic pressure in the second hydraulic chamber.

6. The transmission of claim 1, wherein the friction clutch pack further comprises a friction plate contiguous to a pressure plate, a backing plate and a face plate, wherein the friction plate is rotatably coupled to the input member and the pressure plate is rotatably coupled to a second transmission element rotatably coupled to the output member.

7. The transmission of claim 1, wherein the clutch-apply piston being fluidly coupled to the second hydraulic chamber that is selectively fluidly coupled to the hydraulic circuit comprises the clutch-apply piston being fluidly coupled to the second hydraulic chamber that is selectively fluidly coupled to the hydraulic circuit via a controllable solenoid valve.

8. The transmission of claim 1, wherein the second spring urging the clutch-apply piston comprises the second spring urging the clutch-apply piston to deactivate the clutch assembly.

9. The transmission of claim 1, wherein the second spring comprises a coned-disc spring.

10. A powertrain system, comprising:
an internal combustion engine rotatably coupled to an input member of a transmission device to transfer mechanical power to an output member;
the internal combustion engine being controllable to one of an engine-on state or an engine-off state;
the transmission device including the input member, a hydraulic pump, a hydraulic circuit, a clutch assembly for transferring torque between the input member and the output member;
the hydraulic pump being a mechanically-driven hydraulic pump rotatably coupled to the input member, the hydraulic pump being fluidly connected to the hydraulic circuit;
the clutch assembly including a friction clutch pack, a clutch-apply piston, a clutch-release piston and a first spring;
the clutch-release piston being fluidly coupled to a first hydraulic chamber that is fluidly coupled to the hydraulic circuit;
the clutch-apply piston being fluidly coupled to a second hydraulic chamber that is selectively fluidly coupled to the hydraulic circuit;
a second spring urging the clutch-apply piston; and
the first spring urging the clutch-release piston.

11. The powertrain system of claim 10, wherein when the internal combustion engine is in the engine-off state, the clutch assembly is activated by the first spring urging the clutch-release piston.

12. The powertrain system of claim 11, further comprising the activated clutch assembly having a clutch torque capacity that is based upon a spring constant of the first spring.

13. The powertrain system of claim 11, wherein when the internal combustion engine is in the engine-on state and the transmission is commanded to a neutral state, the clutch assembly is deactivated.

14. The powertrain system of claim 13, wherein when the internal combustion engine is in the engine-on state and the transmission is commanded to a propulsion state, the clutch assembly is activated.

15. The powertrain system of claim 14, wherein when the internal combustion engine is in the engine-on state and the transmission is commanded to a propulsion state, the clutch assembly is activated further comprises the activated clutch assembly having a clutch torque capacity that is based upon hydraulic pressure in the second hydraulic chamber.

16. The powertrain system of claim 10, wherein the friction clutch pack further comprises a friction plate contiguous to a pressure plate, a backing plate and a face plate, wherein the friction plate is rotatably coupled to the input member and the pressure plate is rotatably coupled to a second transmission element rotatably coupled to the output member.

17. The powertrain system of claim 10, wherein the clutch-apply piston being fluidly coupled to the second hydraulic chamber that is selectively fluidly coupled to the hydraulic circuit comprises the clutch-apply piston being fluidly coupled to the second hydraulic chamber that is selectively fluidly coupled to the hydraulic circuit via a controllable solenoid valve.

18. The powertrain system of claim 10, wherein the second spring urging the clutch-apply piston comprises the second spring urging the clutch-apply piston to deactivate the clutch assembly.

19. The powertrain system of claim 10, wherein the first spring urging the clutch-release piston comprises the first spring urging the clutch-release piston to activate the friction clutch pack.

20. A powertrain system, comprising:
an internal combustion engine rotatably coupled to an input member of a transmission device to transfer mechanical power to an output member;
the internal combustion engine being controllable to one of an engine-on state or an engine-off state;
the transmission including the input member, a mechanically-driven hydraulic pump, a hydraulic circuit, and a clutch assembly for transferring torque between the input member and the output member;
the mechanically-driven hydraulic pump being rotatably coupled to the input member and fluidly connected to the hydraulic circuit;
the clutch assembly including a friction clutch pack, a clutch-apply piston, a clutch-release piston and a coned-disc spring;
the clutch-release piston being fluidly coupled to a first hydraulic chamber that is fluidly coupled to the hydraulic circuit;
the clutch-apply piston being fluidly coupled to a second hydraulic chamber that is selectively fluidly coupled to the hydraulic circuit;
a second spring urging the clutch-apply piston; and
the coned-disc spring urging the clutch-release piston;
wherein when the internal combustion engine is in the engine-off state, the clutch assembly is activated by the coned-disc spring urging the clutch-release piston;
wherein when the internal combustion engine is in the engine-on state and the transmission is commanded to a neutral state, the clutch assembly is deactivated; and
wherein when the internal combustion engine is in the engine-on state and the transmission is commanded to a propulsion state, the clutch assembly is activated.

* * * * *